June 25, 1974    R. F. COE    3,819,787

METHOD OF PRODUCING A PAIR OF SILICON

Filed July 29, 1971

INVENTOR
Roger Frank Coe

United States Patent Office 3,819,787
Patented June 25, 1974

3,819,787
METHOD OF PRODUCING A PAIR OF SILICON
Roger Frank Coe, Birmingham, England, assignor to
Joseph Lucas Industries Limited, Birmingham, England
Filed July 29, 1971, Ser. No. 167,160
Int. Cl. F27b 9/04
U.S. Cl. 264—65                    15 Claims

ABSTRACT OF THE DISCLOSURE

A method of producing a plurality of interconnected silicon nitride parts comprises the steps of starting with a first silicon nitride part, providing on said first part a mixture of silicon nitride, which is substantially in the α-phase, and up to 25% by weight of a fluxing agent, and hot pressing the mixture of silicon nitride and the fluxing agent onto the first part so as to produce a second, hot pressed silicon nitride part interconnected with the first part.

---

This invention relates to a method of producing a plurality of interconnected silicon nitride parts.

A method, according to the invention, comprises the steps of starting with a first silicon nitride part, providing on said first part a mixture of silicon nitride, which is substantially in the α-phase, and up to 25% by weight of a fluxing agent, and hot pressing the mixture of silicon nitride and the fluxing agent onto said first part so as to produce a second, hot pressed silicon nitride part interconnected with the first part.

Preferably, the first silicon nitride part is positioned within a complementarily shaped die cavity during the pressing operation.

Preferably, the mixture of silicon nitride and the fluxing agent is provided on said first part, between said fixing part and a further silicon nitride part, and the hot pressing step is arranged to produce said second part in the form of a hot-pressed silicon nitride joint interconnecting the first part and the further part.

Prefeably, each of said first and further silicon nitride parts is positioned within a complementarily shaped die cavity during the pressing operation.

Preferably, the mixture of silicon nitride and the fluxing agent is provided on said first part in powder form or, alternatively, as a paste or as a slurry or as a preform of the required shape.

Preferably, the fluxing agent is magnesium oxide and conveniently the magnesium oxide is present in the mixture in amount between 1% and 5% by weight of the mixture.

Conveniently, the hot pressing is carried at a temperature between 1400° C. and 1750° C.

In the accompanying drawings.

Figure 1:
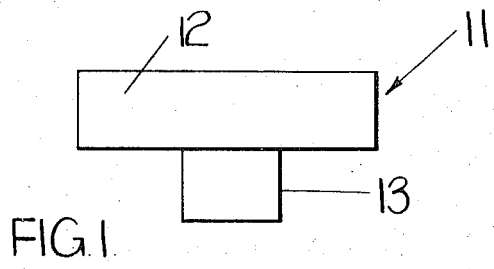
Figure 2:
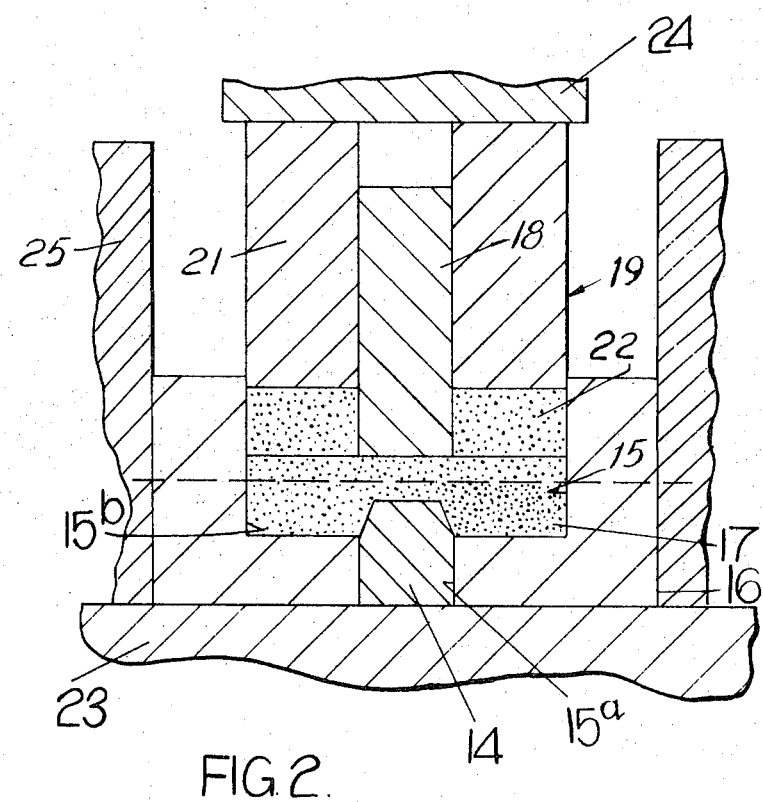

FIG. 1 is a side view of a silicon nitride component produced by a method according to one example of the invention, and FIG. 2 is a sectional view illustrating one stage during the method of producing the component shown in FIG. 1.

Referring to the drawings, in one example of the invention it was required to manufacture the silicon nitride component indicated at 11 in FIG. 1. The component 11 comprised a cylindrical head portion 12 of diameter 1 inch and axial length 0.25 inch, and a cylindrical shank portion 13 extending from one end of the head portion 12, both the axial length and the diameter of the shank portion being 0.25 inch.

The component 11 was in the form of a pair of interconnected, silicon nitride parts and was manufactured by hot pressing silicon nitride powder together with a flux onto a cylindrical, hot pressed silicon nitride part 14. The part 14 had an axial length of 0.375 inch and a diameter of 3.25 inch and, as shown in FIG. 2, to manufacture the component 11 the part 14 was introduced into a die cavity 15 defined within a fixed die part 16. The fixed die part 16 was formed of Atcheson CS graphite and the walls of the die cavity 15 were spray coated with boron nitride powder. The die cavity 15 was stepped to define a narrow portion 15a and a wide portion 15b, the part 14, which defined the shank portion 13 of the finished component, being received in the narrow portion 15a but extending at one end 0.125 inch into the wide portion 15b. Preferably, as shown in FIG. 2, the end of the part 14 projecting into the wide portion 15b was relieved so that during the hot pressing operation to produce the component 11, a component of the pressing force was directed onto the cylindrical surface of the part 14 adjacent said end of the part. In this way, it was found to be possible to produce a hot pressed component the density of which was substantially constant over the whole of the component.

With the part 14 in position in the die cavity 15, a mixture of silicon nitride powder and 1.25% by weight of a powdered magnesium oxide flux was introduced into the wide portion 15b of the die cavity. The silicon nitride in the mixture contained at least 90% of the α-phase material and had a particle size of less than 8 microns, with the mean particle size being 2 microns. The powder mixture was tapped to produce a dense, powder layer 17 extending to a height of 0.5 inch above the step in the die cavity 15. A cylindrical punch member 18 was then inserted into the wide portion 15b of the die cavity 15 from the end thereof remote from the part 14 so that the free end of the punch member 18 contacted the surface of the powder layer 17. The punch member 18 defined one part of a two-part punch assembly 19, the other part of the punch assembly 19 being in the form of a hollow, cylindrical punch member 21 surrounding the member 18. The punch members 18, 21 were movable relative to one another and each of the punch members was formed of Morgan EY9 graphite. A further quantity of the mixture of silicon nitride and magnesium oxide powders was then introduced in the die cavity 15 on top of the powder layer 17 so as, after tapping, to produce a second powder layer 22 extending to a height of 0.25 inch above the top of the powder layer 17. At this stage, the punch member 21 was moved into the die cavity 15 to contact the surface of the powder layer 22, whereafter the assembly was ready for the hot pressing operation.

To effect hot pressing, the assembly was positioned in a further die 25 in a suitable furnace and a pair of silicon nitride pressure pads 23, 24 were used to compress the powder within the die cavity 15. The pressure pad 23 engaged the ends of the fixed die part 16 and the silicon nitride part 14 respectively remote from the punch assembly 19, whereas the pressure pad 24 engaged the end of the punch member 21 projecting from the die cavity 15. In the initial pressing position, shown in FIG. 2, the end of the punch member 18 projecting from the die cavity 15 was spaced by a distance of 0.25 inch from the end of the pressure pad 24 so that during the pressing operation the punch member 21 initially moved relative to the member 18. The relative positioning of the members 18, 21 was of course necessary so as to ensure even compaction of the powder during the hot pressing process.

In a third example of the invention, a pair of hot pressed silicon nitride parts were interconnected by coating the surfaces of the parts to be joined with a slurry of silicon nitride powder, together with 2% by weight of magnesium oxide powder and between 5% and 15%, or more of preferably 10% of polyisobutylene. The silicon nitride used contained at least 95% of the α-phase material and the polyisobutylene was that sold under the trade name Oppanol as supplied by B.A.S.F. G.m.b.H., the slurry being diluted to the required coating consistency with toluene. After coating the surfaces of the parts, the toluene was removed from the slurry by drying the parts at 110° C. The parts were then baked at 450 C. to remove the polyisobutylene, whereafter the parts were hot pressed together so as to form the required joint between the parts.

It is to be appreciated that the mixture of silicon nitride and the fluxing agent used in the method of the invention can also be in the form of a paste, or as a preform. Further it is to be appreciated that one or both of the pair of interconnected silicon nitride parts produced by the present method can be formed of reaction bonded silicon nitride, instead of hot pressed silicon nitride. In this respect it is to be understood that a hot pressed silicon nitride part is a part which is formed by hot pressing silicon nitride powder to the required shape, whereas a reaction bonded silicon nitride part is a part which is formed by sintering silicon in an atmosphere containing nitrogen.

While magnesium oxide has been described as the preferred flux in the examples quoted it will be appreciated that other fluxing materials, for example, magnesium nitride and ferric oxide could replace the magnesium oxide. A pressure of 4,000 p.s.i. was applied between the pads 23, 24 and the temperature of the furnace was raised to 1740° C. to effect the hot pressing operation. Although the punch member 21 was initially moved relative to the member 18 as pressure was applied to the pressure pads 23, 24, during final pressing of the powder within the die cavity 15 to produce the required component, the punch members 18, 21 moved together to compress the powder to the position indicated by the dotted line in FIG. 2. Modulus of rupture figures taken on samples across the joint had a mean value of 120,000 p.s.i.

In a second example of the invention (not shown) it was required to interconnect a pair of hot pressed silicon nitride parts, and a powdered mixture of silicon nitride containing at least 95% of the α-form and 5% by weight of powdered magnesium oxide as a fluxing agent was provided between the regions of the parts to be joined together. A pressure of 1 to 1½ tons per squire inch was applied between the parts in a direction to compress the mixture interposed between the regions to be joined together and at the same time the silicon nitride in the mixture was sintered at 1650° C. so as to produce a hot pressed silicon nitride joint between the parts. Preferably, during formation of the joint, the hot pressed parts were received in respective graphite dies, conveniently the dies used in the initial formation of the parts by hot pressing, and in this way, deformation of the parts during hot pressing of the joint was prevented. In one particular example of joining a pair of hot pressed silicon nitride parts by the method described above, the measurement of the modulus of rupture of the resultant joint gave a value in excess of 80,000 p.s.i.

What is claimed is:

1. A method of producing a plurality of interconnected silicon nitride parts, comprising providing on a first silicon nitride part a mixture of silicon nitride which is at least about 90% in the α-phase, and up to 25% by weight of a silicon nitride fluxing agent, and hot pressing, under hot pressing conditions, the mixture of silicon nitride and the fluxing agent onto said first part so as to produce a second, hot pressed silicon nitride part interconnected with the first part.

2. A method as claimed in claim 1 wherein said first silicon nitride part is positioned within a complementarily shaped die cavity during the pressing operation.

3. A method as claimed in claim 1 wherein the mixture of silicon nitride and the fluxing agent is provided on said first part between said first part and a further silicon nitride part, whereby during the hot pressing step said second part is produced in the form of a hot pressed silicon nitride joint interconnecting the first part and the further part.

4. A method as claimed in claim 3 wherein each of said first and further silicon nitride parts is positioned within a complementarily shaped die cavity during the pressing operation.

5. A method as claimed in claim 1 wherein the mixture of silicon nitride and the fluxing agent is provided on said first part in powder form.

6. A method as claimed in claim 1 wherein the mixture of silicon nitride and the fluxing agent is provided on said first part in the form of a paste.

7. A method as claimed in claim 1 wherein the mixture of silicon nitride and the fluxing agent is provided on said first part in the form of a slurry.

8. A method as claimed in claim 1 wherein the mixture of silicon nitride and the fluxing agent is provided on said first part in the form of a preform of the required shape.

9. A method as claimed in claim 1 wherein the first part is formed of hot pressed silicon nitride.

10. A method as claimed in claim 1 wherein the first part is formed of reaction bonded silicon nitride.

11. A method as claimed in claim 3 wherein the further part is formed of hot pressed silicon nitride.

12. A method as claimed in claim 3 wherein the further part is formed of reaction bonded silicon nitride.

13. A method as claimed in claim 1 wherein the fluxing agent is magnesium oxide.

14. A method as claimed in claim 13 wherein the magnesium oxide is present in the mixture in amounts between 1% and 5% by weight of the mixture.

15. A method as claimed in claim 1 wherein hot pressing of the mixture is carried out at a temperature between 1400° C. and 1750° C.

References Cited

UNITED STATES PATENTS

| | | | |
|---|---|---|---|
| 3,239,323 | 3/1966 | Folweiler | 264—332 |
| 3,589,880 | 6/1971 | Clark | 264—332 |

FOREIGN PATENTS

| | | | |
|---|---|---|---|
| 970,639 | 9/1964 | Great Britain | 264—332 |

OTHER REFERENCES

J. E. Burke (Ed.), *Progress In Ceramic Science*, Vol. 4, 1967, Pergamon Press, New York, at page 103.

DONALD J. ARNOLD, Primary Examiner

U.S. Cl. X.R.

264—332